(No Model.)
J. R. FRANCE.
PROCESS OF MANUFACTURING COLLARS AND CUFFS, &c.
No. 392,794. Patented Nov. 13, 1888.
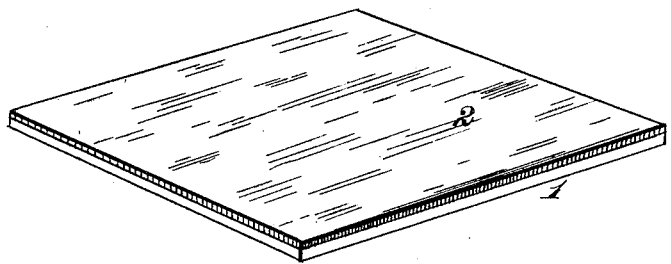
Fig. 1.
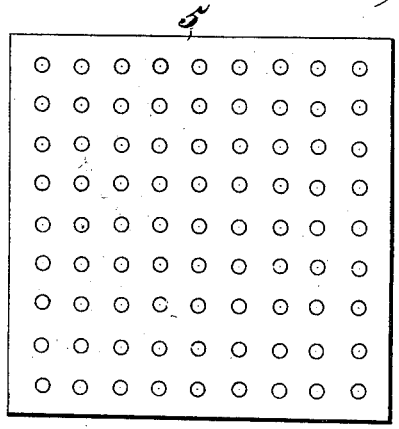
Fig. 2.
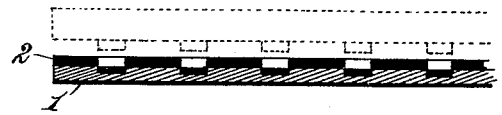
Fig. 3.
Witnesses.
Robert Emmett,
Geo. W. Rea,
Inventor.
Joseph R. France.
By James L. Norris.
Atty.

UNITED STATES PATENT OFFICE.

JOSEPH R. FRANCE, OF NEW YORK, N. Y.

PROCESS OF MANUFACTURING COLLARS, CUFFS, &c.

SPECIFICATION forming part of Letters Patent No. 392,794, dated November 13, 1888.

Original application filed September 8, 1887, Serial No. 249,142. Divided and this application filed December 22, 1887. Serial No. 258,703. (No specimens.)

*To all whom it may concern:*

Be it known that I, JOSEPH R. FRANCE, a citizen of the United States, residing at New York, in the county of New York and State of New York, have invented new and useful Improvements in the Process of Manufacturing Collars, Cuffs, Shirt-Fronts, &c., of which the following is a specification.

The present invention is a division of the application filed by me September 8, 1887, Serial No. 249,142.

The invention relates to the manufacture of collars, cuffs, and shirt-fronts and other ornamental articles from celluloid, cellonite, or other pyroxyline compound, such articles being imprinted with any desired pattern—such as wide or narrow stripes, rings, polka-dots, or any fanciful pattern—in imitation, both as to design and color, of the linen or percale shirts, collars, and cuffs now extensively worn.

The purpose of my invention is to provide a simple method of producing celluloid imitations of figured goods which shall be permanent and durable in use and free from the objections hitherto experienced in the manufacture of this class of goods.

Referring to the accompanying drawings, in which I illustrate convenient means of practicing my invention, Figure 1 is a view in perspective showing the manner of preparing the celluloid. Fig. 2 is a plan view of the die and a section of the sheets operated upon by said die. Fig. 3 is a sectional view of the finished article produced by my invention.

In the said drawings, the reference-numeral 1 denotes a sheet of celluloid or other pyroxyline compound having a thickness of about twenty one-thousandths of an inch and of white color. To this sheet is cemented another sheet, 2, having a thickness of about five one-thousandths of an inch and of any desired color.

The numeral 5 denotes a die, preferably formed of steel, though it may be made of brass or other metal. Upon the face of this die is cut in relief the pattern to be formed—such as wide or narrow stripes, rings, polka-dots, anchors, &c.—the height of such relief being six one-thousandths of an inch, or a very little greater than the thickness of the upper sheet of celluloid. This die is placed upon the upper or colored sheet of celluloid, with its face resting thereon. Upon the back of the die a second sheet of zinc is laid, and two other cemented sheets of celluloid are imposed thereon, prepared in the manner described. A second die is placed upon the thinner sheet, and the duplication is continued until the press is full. Heat is then applied until the temperature throughout is from 200° to 250° Fahrenheit, whereupon pressure is applied, and the sheets are then allowed to cool and are removed from the press.

It will be found that the dies have formed an intaglio pattern exactly the reverse of that on their faces, the intaglio being in the colored and thinner sheet of celluloid. The depth of the impression will be equal to the height of the relief-pattern of the die, which is a little in excess of the thickness of the colored celluloid sheet. It is evident, therefore, that the portions acted upon by the die will be impressed into the body of the lower and thicker sheet of celluloid, and will form practically an integral portion thereof. The colored sheet is then scraped or removed to a depth of five one-thousandths of an inch, leaving the surface of the thicker sheet nearly even and the pattern appearing thereon. The latter sheet is then placed between muslin or linen sheets and between zinc plates, and is again heated and subjected to pressure, giving the surfaces the exact imitation of the texture of the fabric.

The completed article will consist of the sheet 1, having the pattern composed of integral portions of the colored sheet 2, which are buried in or incorporated with the substance of the sheet 1, as shown at 6, Fig. 3.

Care should be exercised to have the zinc and dies or pattern-plates of accurate uniform thickness, and some judgment must be used in applying the relative degrees of heat and pressure; but any person familiar with the manipulation of celluloid or other compounds of pyroxyline will meet with no difficulty in practicing the invention successfully.

The sheets thus prepared are cut up into cuffs, collars, shirt-fronts, and similar articles.

What I claim is—

1. The process herein set forth of manufacturing imitations of fancy figured goods, said process consisting in cementing together a white and a colored sheet of celluloid or other pyroxyline compound, heating the same, impressing the desired figures from the colored sheet into the white sheet, and slightly below the surface of the latter, and scraping off or otherwise removing the colored sheet, substantially as described.

2. The process set forth, consisting in cementing a thin colored sheet to a thicker white sheet of celluloid or other pyroxyline compound, heating the same, impressing the desired figures from the colored sheet into the white sheet, and slightly below the surface of the latter, scraping or otherwise removing the remaining portion of the colored sheet, and finally pressing the white sheet with the incorporated design between sheets of textile fabric, substantially as described.

In testimony whereof I affix my signature in presence of two witnesses.

JOSEPH R. FRANCE.

Witnesses:
GEORGE C. ELLIOTT,
HENRY S. BARNES.